United States Patent [19]

Nitta et al.

[11] 4,041,140

[45] Aug. 9, 1977

[54] METHOD OF MAKING A SULPHIDE CERAMIC BODY

[75] Inventors: Tsuneharu Nitta, Katano; Shigeru Hayakawa; Yukio Kasahara, both of Hirakata; Ziro Terada, Osaka, all of Japan

[73] Assignee: Matsushita Electric Industrial Co., Ltd., Japan

[21] Appl. No.: 489,048

[22] Filed: July 16, 1974

[51] Int. Cl.$^2$ .................. C01B 17/20; C04B 35/70
[52] U.S. Cl. .................. 423/561 R; 148/1.5; 252/62.9; 252/301.6 S; 264/60; 264/61; 264/65; 427/74; 427/86
[58] Field of Search .............. 423/561, 562, 230, 231, 423/244; 264/61, 62, 60, 65; 148/89, 33.4; 427/74, 86, 87, 217; 252/62.9 J, 301.6 S

[56] References Cited

U.S. PATENT DOCUMENTS

| 605,378 | 6/1898 | Blackmore | 423/561 |
|---|---|---|---|
| 1,686,260 | 10/1928 | Snelling | 423/561 |
| 1,822,293 | 9/1931 | Joseph | 423/230 |
| 1,941,609 | 7/1931 | MacReady | 423/561 |
| 1,941,610 | 12/1931 | MacReady | 423/561 |
| 2,024,393 | 12/1935 | Sexaur | 423/231 |
| 3,700,857 | 11/1972 | Branjes et al. | 264/60 |
| 3,704,232 | 11/1972 | Frey et al. | 252/301.6 S |
| 3,748,095 | 6/1973 | Henderson et al. | 423/562 |
| 3,791,844 | 2/1974 | Tecotzky et al. | 252/301.6 S |

OTHER PUBLICATIONS

Mellor, J. W. Comprehensive Treatise on Inorganic and Theoretical Chemistry, vol. VI, p. 114, Longmans, Green & Co., N.Y., N.Y. 1925.

Primary Examiner—Earl C. Thomas
Assistant Examiner—Gary P. Straub
Attorney, Agent, or Firm—Wenderoth, Lind & Ponack

[57] ABSTRACT

A method of making a polycrystalline sulphide ceramic body by sulphurizing an oxide material in a carbon disulphide atmosphere at a temperature in the range of 400°–1000° C and less than the transforming temperature of the sulphide, which transforming temperature represents either the decomposition temperature or the sublimation temperature inherent to the sulphide. One of the advantages of this method is that sulphides can be easily made by the very strong reduction action of carbon disulphide. This application also relates to sulphides made thereby.

6 Claims, 4 Drawing Figures

METHOD OF MAKING A SULPHIDE CERAMIC BODY

This invention relates to a method of making a polycrystalline sulphide ceramic body and sulphide ceramic bodies made thereby which can advantageously be adapted for electrical elements such as photoconductors, luminescent elements, capacitors, varistors, piezoelectric transducers, magnetic semiconductors, superconductors and combinations thereof.

Most sulphide materials, which are well known in some fields of electrical devices, are to single crystals. For a particular application e.g. for ZnS luminescent bodies, a sulphide material is used in a sheet form which is prepared by incorporating the sulphide powder into materials such as organic binders. However, the amount of natural good-quality single crystals produced is decreasing year by year, and synthetic single crystals are very expensive. In addition, these single crystals are disadvantageous for use in electrical devices because of the necessity of cutting them along a certain crystal axis and of strictly controlling the preparation and concentration of any impurity in them. On the other hand, while the sheet form is quite inexpensively available, it is not heat resistant, and therefore it has a narrow working temperature range.

In contrast to the above-mentioned materials, polycrystalline ceramic bodies are advantageous, because they can be readily configured into desired shapes and are suitable for mass production with relative ease. Furthermore, since a ceramic body has a polycrystalline structure in which each grain is connected to other grains at the grain boundary, the grain boundary as well as the grain can be controlled by doping with an impurity, etc. Therefore, polycrystalline ceramic bodies are advantageous in these respects over single crystals.

Accordingly, a principal object of this invention is to provide polycrystalline sulphide ceramic bodies.

A further object of this invention is to provide a method of making such sulphide ceramic bodies.

These objects are achieved by the method of making a polycrystalline sulphide ceramic body according to the invention comprising preparing a body of polycrystalline oxide material and sulphurizing at least one portion of said body in a carbon disulphide atmosphere at a temperature in the range of 400°–1000° C, said temperature being less than the transforming temperature of said sulphide, and for a time sufficient to make said at least one portion a sulphide.

More details of this invention will become apparent upon consideration of the following description taken together with the accompanying drawings in which.

Figure 1:
FIG. 1 is a schematic cross-sectional view of a sulphide ceramic body in accordance with this invention.

In accordance with this invention, it has been discovered that a polycrystalline sulphide ceramic body can be obtained by sulphurizing at least one portion of a body of polycrystalline oxide material in a carbon disulphide atmosphere at a temperature in the range of 400°–1000° C so as to make the said one portion a sulphide, the sulphurizing temperature being less than the transforming temperature of the resultant sulphide. Each sulphide is decomposed or sublimed when the temperature exceeds a certain temperature. That is, each sulphide has a decomposition temperature or sublimation temperature inherent thereto. The term transforming temperature is used here as a generic term for the decomposition temperature and the sublimation temperature. The sulphurization (reaction sintering) is considered to be attributable to the very strong reducing action of carbon disulphide. Furthermore, the sulphurization occurs below the temperatures at which the formed sulphide decomposes or sublimes. However, since the partial pressure of sulphur caused by dissociation of carbon disulphide increases considerably above 1000° C, the temperature of the sulphurization should preferably be kept less than 1000° C. Starting oxide materials easily react with carbon disulphide at a temperature less than 100° C and also less than the transforming temperature of the corresponding sulphides. The above-recited body of polycrystalline oxide material includes 1, a body prepared by pressure-compacting a starting oxide material consisting essentially of a finely divided powder. In this case, it has been found that the temperature of sulphurization is affected by the mean particle size of the starting oxide material. That is, the larger the particle size is, the higher the temperature should be. In this sense, it is desired that the particle size of the starting oxide material be as fine as possible. The preferred mean particle size is less than 1 micron. Under these conditions, the whole of the oxide material, i.e. the compacted powder, is easily converted to a uniform sulphide material by the sulphurization step.

The above-recited body of oxide material also includes 2, a dense ceramic prepared by mixing a starting polycrystallines oxide material, pressure-compacting the thus mixed material and sintering the thus pressure-compacted material. When the sulphurization is carried out for a long time, the whole of the dense ceramic is sulphurized. When the sulphurization is carried out for an appropriate time, the dense ceramic is partially sulphurized by the sulphurization, and the resultant ceramic body becomes a composite ceramic body composed of a ceramic of the oxide material and a sulphide ceramic. Thus, a junction ceramic can be easily made thereby.

The above-recited body of oxide material further includes 3, a body prepared by mixing a starting polycrystallines oxide material, pressure-compacting the thus mixed material, sintering the thus pressure-compacted material into a ceramic, crushing the thus made ceramic into ceramic particles, and further pressure-compacting the thus made ceramic particles. In this case, the surface layer of each of the ceramic particles is sulphurized by the sulphurization. Of course, when the sulphurization is carried out for a long time, not only the surface but also the bulk of each ceramic particle is sulphurized. Briefly speaking, according to this invention, a metal oxide is used as a starting oxide material, and the result is a metal sulphide. In this applicaion, the "metal" is not limited only to a mono-metal, but also includes metal compounds. For example, $CuGa_2O$ hd 4 is also considered to be a metal oxide, and $CuGa_2S_4$ is also considered to be a metal sulphide.

The advantages of the method of this invention are as follows. Polycrystalline sulphides of high quality can be easily made. This method does not produce so called air pollution of sulphides such as $SO_2$. Thin films of polycrystalline sulphide ceramic materials can be easily made, which is advantageous when it is taken into consideration that the modern electronics industry requires miniaturization and molding of circuits and also requires elements for use at low operating voltages. Since oxides are used as starting materials instead of sulphide powders, mass inexpensive production of such sulphide ceramics becomes possible. The temperature for sulphurization is relatively low. The thickness of the sulphide layers can be easily controlled. A further important feature of this invention is as follows. It is well known that an oxide easily forms a solid solution with any component as compared with a sulphide because the oxide is more stable at high temperature than the sulphide. According to this invention, if an oxide solid solution can be prepared, the oxide solid solution can be easily converted into the corresponding sulphide solid solution due to the low temperature reaction between the oxide and carbon disulphide.

The following is a detailed description of the method of making polycrystalline sulphide ceramics employing the concept of this invention. However the concept of this invention is not limited by all the details described below.

The component oxides are intimately mixed in the desired composition proportions and fired in accordance with the schedule set forth hereinafter for production of a fired ceramic body. The raw materials for the ceramics are commercially pure grade oxides. Any compound which can be converted upon firing to the corresponding oxide can be used as a raw material. Batches of the raw materials are ball-milled with a small amount of water for intimate mixing and dried. Usually, they are pressed at about 750 kg/cm² into a disk form 15 by 1mm. The disk is fired at a temperature less then 1000° C in a carbon disulphide atmosphere. The sulphurizing is done in a transparent quartz combustion tube held horizontally in a tube furnace with a graphite boat containing the starting disk. Dry nitrogen gas is bubbled through a gas washing bottle filled with carbon disulphide to introduce it into the combustion chamber. After firing, the disk is cooled in the furnace with the furnace at "furnace off".

Referring to Table I, examples of the sintering temperature and relative density are shown. As reference data there is set out in Table I the temperature at which each sulphide decomposes or sublimes. These ceramic bodies exhibit a high density characterized by a relative density of more than 92 percent and a uniform ceramic texture of from 1 to 10 microns grain size so that the ceramic bodies are hard, durable and resistant to mechanical abrasion, thermal shock, oxidation and reduction. Furthermore, the simple and economic method of making them is characterized by the fact that the sintering temperature of each ceramic body is much lower than the transforming temperature thereof and less than 1000° C. After firing, the ceramic bodies are analysed with a Geiger-counter type X-ray diffractometer using $CuC\alpha$ radiation. From such tests, it is confirmed that all the ceramic bodies of these compositions consist not of mixed phases such as oxide, oxysulphide and sulphide, but only a sulphide phase. As is apparent from Table I, when using a starting oxide material consisting essentially of a powder having a mean particle size above 1 micron, a temperature more than 1000° C and at the same time a long firing time are required for the sintering. However, the firing conditions are disadvantageous for making a uniform sulphide ceramic body, in which the partial pressure of sulphur caused by dissociation of carbon disulphide increases considerably. The sulphide ceramic body shown in FIG. 1 consists of uniform sulphide phase 1. These sulphide ceramics may be used for elements in various fields, for example in electrical devices such as semiconductors, piezoelectric transducers, magnet, superconductors or combinations thereof, refractory materials, etc.. These sulphide ceramic bodies may be made in a disc shape, and in a rectangular shape, in a single or multiple layer or as a single or multiple discs. They may also be of tubular form. It has been further discovered according to the this invention that a junction ceramic body comprising a ceramic material layer consisting essentially of a polycrystalline oxide ceramic body and another layer consisting essentially of the corresponding polycrystalline sulphide ceramic body can be obtained by sulphurizing at least one portion of a starting oxide ceramic body in a carbon disulphide atmosphere at a temperature ranging from 400° to 1000° C and which is lower than the decomposition or sublimation temperature of the corresponding sulphide. The feature of the method in this case consists in sintering the starting oxide material to make it very dense, and thereafter sulphurizing the oxide ceramic body in a carbon disulphide atmosphere at a temperature which is, for example, considerably lower than the transforming temperature of the corresponding sulphide. Carbon disulphide diffuses through the outer portion of the oxide ceramic body gradually into the inner portion and converts the surface layer of the ceramic body up to a certain depth to a uniform sulphide layer. The formed sulphide layer is well-sintered by the reaction-sintering process proceeding in the presence of the reaction between the oxide and carbon disulphide as afore-said. Furthermore, the thickness of the formed sulphide layer can be easily controlled by varying the sulphurizing conditions such as the firing temperature and time. Therefore, almost all of the oxide ceramic can be converted into the sulphide ceramic.

Figure 2:
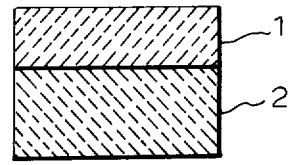
FIG. 2 is a schematic cross-sectional view of a composite ceramic body comprising a ceramic material layer consisting essentially of an oxide ceramic body and a layer consisting essentially of the corresponding sulphide ceramic body in accordance with this invention.
Figure 3:
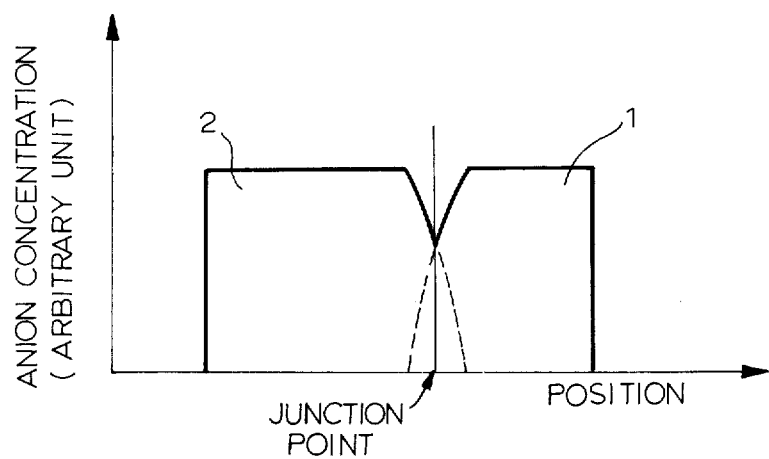
FIG. 3 is a drawing of anion concentrations of the ceramic body shown in FIG. 2.

FIG. 2 shows a ceramic body in which an oxide ceramic body 2 has one surface thereof treated by the above method to form a sulphide ceramic layer 1. In FIG. 3, there is schematically shown the distribution of the sulphur and oxygen concentrations of the ceramic body in FIG. 2. It can be understood that the ceramic body shown in FIG. 2 and FIG. 3 has a kind of heterojunction between the oxide and the sulphide. The formation of a heterojunction is apparent from the fact that when an electric field is applied to the junction ceramic body, a peak of the field strength appears at the junction of the oxide and the sulphide. The heterojunction ceramic body can exhibit various electrical properties based upon the junction portion formed at the interface of the oxide and the sulphide. Therefore, the junction ceramic body can be used e.g. for nonlinear elements in electrical devices.

A preferred method of making a junction ceramic body according to this invention is carried out in accordance with a schedule set forth hereinafter.

The raw materials for the ceramics are commercially pure grade oxide powders. Any compound which can be converted upon firing to the corresponding oxide can be used as a raw material. Batches of the raw materials are ball-milled with a small amount of water for intimate mixing and dried. They are pressed at 750Kg/cm² into a pellet form. The pellet form is sintered in air pellet form is sintered in air at a temperature as shown in Table II. The sintered oxide ceramic body is then fired in a carbon disulphide atmosphere at a temperature below 1000° C by using the above described sulphurizing apparatus. The thickness of the formed sulphide layer is measured by per se conventional microscopic observations. The density of the sintered body is determined in a per se conventional manner and is expressed as relative density. Typical examples of junction ceramic bodies comprising a ceramic material layer consisting essentially of an oxide ceramic body and another layer consisting essentially of the corresponding sulphide ceramic body are shown in Table II, which gives the sintering conditions and relative densities of the oxide and the sulphide portion in each composition. The ceramic bodies exhibit a high density and uniform two layer structure. The thickness of the sulphide layer can be easily varied by controlling the sulphurizing conditions such as the firing temperature and time.

By way of example, ZnS can be used for a light emitting element. In this case, the ceramic body must have a two layer structure in which a ZnO ceramic body activated with Mn and Cu has one surface thereof treated by the above-described sulphurizing method to form a ZnS ceramic layer. The junction ceramic body emits light from the junction portion formed at the interface of the ZnO and the Zns when a D.C. and an A.C. voltage is applied thereto. The emitted light is uniform and does not change with time. This light emitting element is free from the problems of the conventional ZnS light emitting body such as one in which a ZnS powder is incorporated in a dispersion binder of high dielectric material with the aid of the effects of electrode materials, etc. Therefore it is apparent that the luminous efficiency is drastically improved by the junction ceramic made in accordance with this invention as it has a value more than 0.6%.

In other respects, a junction ceramic body can be used in such devices such as photovoltaic elements capacitors piezoelectric transducers, diodes, etc.

Figure 4:
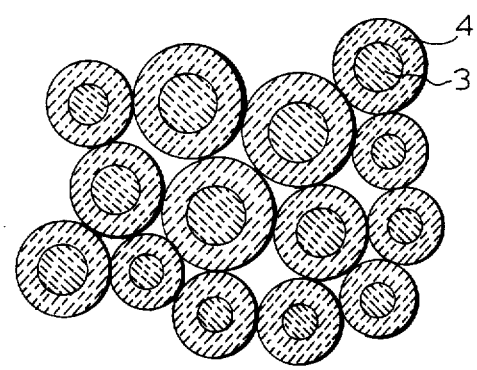
FIG. 4 is an exaggerated schematic cross-sectional view of a ceramic body comprising a polycrstalline ceramic material consisting of ceramic particles each having a sulphide layer surrounding the corresponding oxide particle in accordance with this invention.

According to this invention, it has been discovered furthermore that a ceramic material consisting of particles each having a sulphide layer surrounding the corresponding oxide particle can be obtained by sulphurizing a surface layer of an oxide particle. A preferred method of making such ceramic body comprises crushing a polycrystalline oxide ceramic body into a powder such as shown in Table II, pressure-compacting the powder, and thereafter sulphurizing at least the surface layer of said oxide particles in a carbon disulphide atmosphere at a temperature ranging from 400° to 1000° C which is lower than the decomposition or sublimation temperature of said sulphide. Under these conditions, substantially all the oxide particles have the surface layer converted to sulphide. FIG. 4 shows a schematic cross section (microstructure) of a ceramic body consisting of particles each having a sulphide layer 4 surrounding the corresponding oxide particle 3, the regions having been exaggerated. Such a ceramic body is also believed to form a heterojunction at the interface of the oxide and the sulphide. Table III shows typical examples of ceramic materials consisting of particles each having a sulphide layer surrounding the corresponding oxide particle. These ceramic bodies can exhibit heterojunction properties at the interface of the oxide and the sulphide. For example, semiconductors such as CdS and PbS can show an improved photoconductivity. A luminescent element of ZnS can emit light directly from the surface at which the junction portion can be formed.

Tables I, II and III are for the purpose of showing typical examples falling within the scope of this invention but they do not list all the examples falling within the scope of this invention. For example, in Table I, all the rare earth elements are not listed therein, but it is clear that the oxides of the other rare earth elements can similarly be used as the starting oxide materials.

Table I

| | Starting Oxide Material | | Sulphurizing Conditions | | Product | | |
|---|---|---|---|---|---|---|---|
| No. | Composition (mole) | Mean Particle size (μm) | Temperature (° C) | Time (hr) | Sulphide | Relative Density (%) | Decomposition or sublimation Temperature (° C) |
| 1 | ZnO | 0.7 | 800 | 4 | ZnS | 98 | 1185 |
| 2 | ZnO | 1.0 | 950 | 4 | ZnS | 98 | 1185 |
| 3* | ZnO | 1.5 | 1050 | 24 | ZnS | 90 | 1185 |
| 4* | ZnO | 2.0 | 1080 | 136 | ZnS(small amount of ZnO) | 82 | 1185 |
| 5 | CdO | 0.3 | 550 | 1 | CdS | 96 | 980 |
| 6 | PbO | 0.4 | 500 | 4 | PbS 94 | 800 | |
| 7 | $Cu_2O$ | 0.8 | 450 | 4 | $Cu_2S$ | 92 | 600 |
| 8 | $SnO_2$ | 0.2 | 580 | 4 | $SnS_2$ | 98 | 700 |
| 9 | $TiO_2$ | 0.1 | 900 | 4 | $TiS_2$ | 98 | 1100 |
| 10 | $ZrO_2$ | 0.1 | 900 | 4 | $ZrS_2$ | 98 | 1480 |
| 11 | $Nb_2O_5$ | 0.7 | 900 | 4 | NbS | 98 | 1350 |
| 12 | $Ta_2O_5$ | 0.5 | 900 | 4 | TaS | 99 | 1400 |
| 13 | $Cr_2O_3$ | 0.8 | 800 | 4 | $Cr_2S_3$ | 96 | 1250 |
| 14 | $MnO_2$ | 0.7 | 800 | 4 | MnS | 98 | 1300 |
| 15 | FeO | 0.7 | 800 | 6 | FeS | 96 | 1120 |
| 16 | NiO | 0.8 | 600 | 4 | NiS | 99 | 810 |
| 17 | CoO | 0.8 | 640 | 2 | CoS | 99 | 1135 |
| 18 | $Ga_2O_3$ | 0.5 | 600 | 2 | $Ga_2S_3$ | 92 | 1255 |
| 19 | $In_2O_3$ | 0.8 | 600 | 4 | $In_2S_3$ | 94 | 850 |
| 20 | $Bi_2O_3$ | 0.8 | 500 | 4 | $Bi_2S_3$ | 92 | 685 |
| 21 | MgO | 0.1 | 900 | 4 | MgS | 98 | 1800 |
| 22 | CaO | 0.2 | 900 | 2 | CaS | 98 | 1620 |
| 23 | SrO | 0.2 | 900 | 2 | SrS | 98 | 1570 |
| 24 | BaO | 0.1 | 900 | 2 | BaS | 96 | 1480 |
| 25 | $MoO_2$ | 0.3 | 900 | 2 | $MoS_2$ | 98 | 1185 |
| 26 | $CeO_2$ | 0.1 | 900 | 4 | $Ce_2S_3$ | 94 | 1500 |
| 27 | $La_2O_3$ | 0.1 | 900 | 4 | $La_2S_3$ | 96 | 1480 |
| 28 | $DyO_2$ | 0.1 | 900 | 4 | $Dy_2S_3$ | 96 | 1480 |

Table I-continued

| No. | Starting Oxide Material Composition (mole) | Mean Particle size (μm) | Sulphurizing Conditions Temperature (°C) | Time (hr) | Sulphide | Product Relative Density (%) | Decomposition or sublimation Temperature (°C) |
|---|---|---|---|---|---|---|---|
| 29 | Er$_2$O$_3$ | 0.1 | 900 | 4 | Er$_2$S$_3$ | 92 | 1320 |
| 30 | Eu$_2$O$_3$ | 0.1 | 900 | 4 | EuS | 96 | 1360 |
| 31 | Nd$_2$O$_3$ | 0.1 | 900 | 4 | Nd$_2$S$_3$ | 96 | 1300 |
| 32 | Sm$_2$O$_3$ | 0.1 | 900 | 4 | Sm$_2$S$_3$ | 96 | 1420 |
| 33 | Y$_2$O$_3$ | 0.1 | 850 | 4 | Y$_2$S$_3$ | 96 | 1560 |
| 34 | V$_2$O$_3$ | 0.6 | 700 | 6 | V$_2$S$_3$ | 97 | 920 |
| 35 | (Cd$_{0.5}$Zn$_{0.5}$)O | 0.8 | 750 | 2 | (Cd$_{0.5}$Zn$_{0.5}$)S | 98 | 1020 |
| 36 | (Fe$_{0.5}$Ni$_{0.5}$)O | 0.6 | 700 | 4 | (Fe$_{0.5}$Ni$_{0.5}$)S | 98 | 1040 |
| 37 | (Co$_{0.5}$Fe$_{0.5}$)O | 0.8 | 800 | 4 | (Co$_{0.5}$Fe$_{0.5}$)S | 98 | 1000 |
| 38 | (Zn$_{0.5}$Fe$_{0.5}$)O | 0.8 | 800 | 4 | (Zn$_{0.5}$Fe$_{0.5}$)S | 98 | 1050 |
| 39 | (Cd$_{0.5}$Fe$_{0.5}$)O | 0.8 | 600 | 2 | (Cd$_{0.5}$Fe$_{0.5}$)S | 96 | 980 |
| 40 | (Mn$_{0.5}$Fe$_{0.5}$)O | 0.8 | 800 | 4 | (Mn$_{0.5}$Fe$_{0.5}$)S | 96 | 1000 |
| 41 | (Ni$_{0.5}$Zn$_{0.5}$)O | 0.8 | 700 | 4 | (Ni$_{0.5}$Zn$_{0.5}$)S | 98 | 1200 |
| 42 | (Y$_{0.5}$Fe$_{0.5}$)O | 0.6 | 700 | 4 | (Y$_{0.5}$Fe$_{0.5}$)S | 96 | 1020 |
| 43 | (Eu$_{0.5}$Fe$_{0.5}$)O | 0.6 | 700 | 4 | (Eu$_{0.5}$Fe$_{0.5}$)S | 96 | 1020 |
| 44 | (Sr$_{0.5}$Fe$_{0.5}$)O | 0.6 | 800 | 4 | (Sr$_{0.5}$Fe$_{0.5}$)S | 98 | 1060 |
| 45 | (Cu$_{0.5}$Fe$_{0.5}$)O | 0.8 | 600 | 4 | (Cu$_{0.5}$Fe$_{0.5}$)S | 96 | 880 |
| 46 | (Ba$_{0.5}$Fe$_{0.5}$)O | 0.8 | 650 | 4 | (Ba$_{0.5}$Fe$_{0.5}$)S | 98 | 920 |
| 47 | (Mg$_{0.5}$Fe$_{0.5}$)O | 0.8 | 850 | 4 | (Mg$_{0.5}$Fe$_{0.5}$)S | 98 | 1060 |
| 48 | CuAl$_2$O$_4$ | 0.5 | 600 | 2 | CuAl$_2$S$_4$ | 94 | 800 |
| 49 | CuGa$_2$O$_4$ | 0.7 | 600 | 2 | CuGa$_2$S$_4$ | 96 | 800 |
| 50 | NiCr$_2$O$_4$ | 0.6 | 800 | 4 | NiCr$_2$S$_4$ | 98 | 1200 |
| 51 | CuCr$_2$O$_4$ | 0.8 | 580 | 4 | CuCr$_2$S$_4$ | 96 | 700 |
| 52 | CoCr$_2$O$_4$ | 0.8 | 800 | 4 | CoCr$_2$S$_4$ | 98 | 800 |
| 53 | ZnCr$_2$O$_4$ | 0.8 | 860 | 4 | ZnCr$_2$S$_4$ | 98 | 950 |
| 54 | CdCr$_2$O$_4$ | 0.8 | 640 | 2 | CdCr$_2$S$_4$ | 96 | 700 |
| 55 | FeCr$_2$O$_4$ | 0.8 | 800 | 4 | FeCr$_2$S$_4$ | 98 | 1060 |
| 56 | MnCr$_2$O$_4$ | 0.8 | 800 | 4 | MnCr$_2$S$_4$ | 98 | 1040 |
| 57 | AgInO$_2$ | 0.6 | 500 | 2 | AgInS$_2$ | 96 | 700 |
| 58 | BaZrO$_3$ | 0.4 | 900 | 4 | BaZrS$_3$ | 98 | 1560 |
| 59 | BaTiO$_3$ | 0.2 | 700 | 2 | BaTiS$_3$ | 98 | 1020 |
| 60 | CaZrO$_3$ | 0.4 | 900 | 4 | CaZrS$_3$ | 98 | 1560 |
| 61 | PbZrO$_3$ | 0.3 | 700 | 2 | PbZrS$_3$ | 92 | 780 |
| 62 | BaSnO$_3$ | 0.4 | 800 | 4 | BaSnS$_3$ | 96 | 1080 |
| 63 | FeSnO$_3$ | 0.6 | 800 | 2 | FeSnS$_3$ | 94 | 1020 |
| 64 | Ag$_3$SbO$_3$ | 0.8 | 500 | 2 | Ag$_3$SbS$_3$ | 94 | 760 |
| 65 | Ni$_3$SnO$_7$ | 0.5 | 600 | 4 | Ni$_3$SnS$_7$ | 92 | 900 |

*method falling outside this invention

Table II

| No. | Starting Oxide Ceramic Body Starting Material | Sintering Conditions Temperature (°C) | Time (hr) | Relative Density (%) | Sulphurizing Conditions Temperature (°C) | Time (hr) | Formation of Sulphide layer Product | Thickness of Sulphide layer | Relative Density (%) |
|---|---|---|---|---|---|---|---|---|---|
| 1 | ZnO | 1350 | 2 | 98.2 | 800 | 4 | ZnS | 60 | 96.2 |
| 2 | ZnO | 1350 | 2 | 98.2 | 700 | 1 | ZnS | 5 | 96.0 |
| 3 | ZnO | 1350 | 2 | 98.2 | 950 | 6 | ZnS | throughout | 97.0 |
| 4 | CdO | 800 | 2 | 94.3 | 500 | 4 | CdS | 90 | 97.5 |
| 5 | PbO | 800 | 2 | 96.5 | 400 | 6 | PbS | 450 | 95.3 |
| 6 | Cu$_2$O | 1000 | 2 | 96.0 | 400 | 2 | Cu$_2$S | 600 | 94.7 |
| 7 | SnO$_2$ | 1380 | 2 | 94.0 | 580 | 2 | SnS$_2$ | 20 | 96.0 |
| 8 | TiO$_2$ | 1380 | 2 | 98.0 | 900 | 6 | TiS$_2$ | 86 | 97.0 |
| 9 | ZrO$_2$ | 1900 | 2 | 95.0 | 900 | 6 | ZrS$_2$ | 40 | 95.0 |
| 10 | Ta$_2$O$_5$ | 1380 | 2 | 99.0 | 900 | 2 | TaS | 70 | 99.2 |
| 11 | Cr$_2$O$_3$ | 1340 | 2 | 96.0 | 800 | 2 | Cr$_2$S$_3$ | 10 | 96.2 |
| 12 | MnO$_2$ | 1300 | 2 | 94.0 | 800 | 2 | MnS | 80 | 97.0 |
| 13 | NiO | 1300 | 2 | 97.0 | 600 | 1 | NiS | 50 | 98.0 |
| 14 | CoO | 1300 | 2 | 98.0 | 600 | 1 | CoS | 50 | 97.0 |
| 15 | In$_2$O$_3$ | 550 | 2 | 93.0 | 600 | 1 | In$_2$S$_3$ | 400 | 98.0 |
| 16 | BaO | 1400 | 2 | 98.0 | 900 | 2 | BaS | 120 | 96.0 |
| 17 | MoO$_2$ | 1600 | 2 | 98.0 | 900 | 1 | MoS$_2$ | 60 | 98.0 |
| 18 | Eu$_2$O$_3$ | 1300 | 2 | 96.0 | 900 | 1 | EuS | 40 | 96.5 |
| 19 | CuAl$_2$O$_4$ | 1200 | 2 | 98.0 | 600 | 1 | CuAl$_2$S$_4$ | 20 | 95.0 |
| 20 | CuGa$_2$O$_4$ | 1150 | 2 | 96.0 | 600 | 1 | CuGa$_2$S$_4$ | 25 | 93.2 |
| 21 | CuCr$_2$O$_4$ | 1200 | 2 | 97.0 | 600 | 1 | CuCr$_2$S$_4$ | 50 | 98.0 |
| 22 | CoCr$_2$O$_4$ | 1240 | 2 | 96.0 | 800 | 1 | CoCr$_2$S$_4$ | 60 | 97.2 |
| 23 | (Cd$_{0.5}$Zn$_{0.5}$)O | 1100 | 2 | 98.0 | 750 | 1 | (Cd$_{0.5}$Zn$_{0.5}$)S | 120 | 98.0 |
| 24 | (Zn$_{0.5}$Pb$_{0.5}$)O | 1100 | 2 | 97.0 | 600 | 1 | (Zn$_{0.5}$Pb$_{0.5}$)O | 60 | 96.0 |
| 25 | ZnO-SnO$_2$ | 1300 | 2 | 98.0 | 750 | 1 | ZnS-SnS$_2$ | 140 | 97.0 |

Table III

| No. | Preparation of Starting Oxide Powder Composition | Sintering Conditions Temperature (°C) | Time (hr.) | Mean Particle size of the crushed powder (μm) | Sulphurizing Conditions Temperature (°C) | Time (hr.) | Structure of the particle | Porosity (%) |
|---|---|---|---|---|---|---|---|---|
| 1 | ZnO | 1350 | 2 | 4.0 | 700 | 8 | ZnS layer surrounding ZnO particle CdS layer | 3.2 |

Table III-continued

| | | Preparation of Starting Oxide Powder | | | Sulphurizing Conditions and Products | | | |
|---|---|---|---|---|---|---|---|---|
| | | Sintering Conditions | | Mean Particle size of the | Sulphurizing Conditions | | Structure | |
| No. | Composition | Temperature (° C) | Time (hr.) | crushed powder (μm) | Temperature (° C) | Time (hr.) | of the particle | Porosity (%) |
| 2 | CdO | 800 | 2 | 5.5 | 500 | 8 | surrounding CdO particle | 2.8 |
| 3 | PbO | 800 | 2 | 3.2 | 400 | 8 | PbS layer surrounding PbO particle | 4.6 |
| 4 | $SnO_2$ | 1380 | 2 | 6.3 | 600 | 4 | $SnS_2$ layer surrounding $SnO_2$ particle | 2.1 |
| 5 | $TiO_2$ | 1380 | 2 | 7.2 | 900 | 4 | $TiS_2$ layer surrounding $TiO_2$ particle | 1.7 |
| 6 | $Cr_2O_3$ | 1340 | 2 | 5.0 | 800 | 2 | $Cr_2S_3$ layer surrounding $Cr_2O_3$ particle | 3.7 |
| 7 | NiO | 1300 | 2 | 3.5 | 600 | 2 | NiS layer surrounding NiO particle | 1.9 |
| 8 | CoO | 1300 | 2 | 3.0 | 650 | 4 | CoS layer surrounding CoO particle | 3.4 |
| 9 | EuO | 1300 | 2 | 6.7 | 900 | 2 | EuS layer surrounding EuO particle | 1.9 |
| 10 | $Cu_2O$ | 1000 | 2 | 4.8 | 400 | 4 | $Cu_2S$ layer surrounding $Cu_2S$ particle | 3.2 |
| 11 | $(Cd_{0.5}Zn_{0.5})O$ | 1100 | 2 | 5.4 | 750 | 4 | $(Cd_{0.5}Zn_{0.5})S$ layer surrounding $(Cd_{0.5}Zn_{0.5})O$ particle | 4.3 |
| 12 | $(Zn_{0.5}Pb_{0.5})O$ | 1100 | 2 | 5.2 | 600 | 4 | $(Zn_{0.5}Pb_{0.5})S$ layer surrounding $(Zn_{0.5}Pb_{0.5})O$ particle | 4.2 |
| 13 | $CuAl_2O_4$ | 1200 | 2 | 8.3 | 600 | 4 | $CuAl_2O_4$ layer surrounding $CuAl_2S_4$ particle | 3.8 |
| 14 | $CoCr_2O_4$ | 1240 | 2 | 3.6 | 800 | 4 | $CoCr_2S_4$ layer surrounding $CoCr_2O_4$ particle | 3.6 |
| 15 | $FeCr_2O_4$ | 1240 | 2 | 4.2 | 800 | 4 | $FeCr_2S_4$ layer surrounding $FeCr_2O_4$ particle | 3.8 |
| 16 | $NiCr_2O_4$ | 1240 | 2 | 3.8 | 800 | 4 | $NiCr_2S_4$ layer surrounding $NiCr_2O_4$ particle | 4.2 |

What is claimed is:

1. A method of making a sulphide ceramic, comprising forming a compacted body from a metal oxide powder starting material, said powder having a mean particle size of less than 1 micron, and sulphurizing at least one portion of said compacted body in an atmosphere consisting essentially of carbon disulphide at a temperature in the range of 400° to 1,000° C, said temperature being less than the transformation temperature of said sulphide and for a time sufficient to make at least one portion a sulphide having a density of at least 92% and a uniform ceramic texture of from 1 to 10 microns grain size.

2. A method according to claim 1, wherein the compacting is performed at a pressure of about 750 kg/cm².

3. A method according to claim 1 wherein said body of oxide material is prepared by pressure-compacting a starting oxide material, and said temperature and time being sufficient to make the whole of said oxide material a uniform sulphide by said sulphurizing step.

4. A method according to claim 1 wherein said body of oxide material is a dense ceramic prepared by mixing a starting polycrystalline oxide material, pressure-compacting the thus mixed material and sintering the thus pressure-compacted material.

5. A method according to claim 1 wherein said body of oxide material is prepared by mixing a starting polycrystalline oxide material, pressure-compacting the thus mixed material, sintering the thus pressure-compacted material into a ceramic, crushing the thus made ceramic into ceramic particles, and further pressure-compacting the thus made ceramic particles, and said temperature and time are sufficient to sulphurize at least the surface layer of each of said ceramic particles.

6. A method according to claim 1 wherein said oxide material is a metal oxide, the metal of which is at least one member selected from the group consisting of Zn, Cd, Pb, Cu, Sn, Ti, Zr, Nb, Ta, Cr, Mn, Fe, Ni, Co, Ga, In, Bi, Mg, Ca, Sr, Ba, Mo, Ce, La, Dy, Er, Eu, Nd, Sm, Y and V.

* * * * *